June 11, 1968 G. G. RUMBERGER Re. 26,402

SEALABLE OVERLAP CARTON

Original Filed Aug. 23, 1961

INVENTOR
GEORGE G. RUMBERGER
BY Gordon M. Kuescher
ATTORNEY

United States Patent Office

Re. 26,402
Reissued June 11, 1968

26,402
SEALABLE OVERLAP CARTON

George G. Rumberger, Portage, Mich., assignor, by mesne assignments, to Brown Company, New York, N.Y., a corporation of Delaware Original No. 3,194,473, dated July 13, 1965, Ser. No. 133,420, Aug. 23, 1961. Application for reissue Nov. 24, 1967, Ser. No. 689,735
14 Claims. (Cl. 229—37)

Matter enclosed in heavy brackets [ ] appears in the original patent but forms no part of this reissue specification; matter printed in italics indicates the additions made by reissue.

*ABSTRACT OF THE DISCLOSURE*

*Carton blanks and cartons formed therefrom having an inner flap, full outer flap, and intermediate flap hinged to a carton panel opposite the panel to which the outer flap is hinged, the intermediate flap being recessed along an edge so as to be narrower than said outer flap and provide an area of overhang of said intermediate flap by said outer flap along a transverse side of said intermediate flap perpendicular to its hinge line, at least one of said flaps provided with adhesive adapted to be disposed and activated in the area of overhang, the adhesive securing the outer flap to the inner flap in the area of overhang. Preferably the carton is constructed of laminated sheet material with said adhesive being provided from between the plies of said laminated sheet material.*

The present invention relates to carton blanks, cartons, and a method of forming sealed cartons, and is more particularly concerned with carton blanks in which the adhesive for sealing of the carton erected from such blank is carried by or indigenous to the material of construction of the carton blank, with erected and sealed cartons formed from such blanks, and with a novel method of forming such sealed cartons. Because the adhesive is either carried by or indigenous to the material of construction of the carton blanks of the invention and cartons formed therefrom in the area of the closure flaps, there is no need to provide adhesive extraneously. Because the intermediate closure flap of the carton is recessed at its edges so that the outer flap of the carton overlies the intermediate flap along its edges upon folding of the flaps, the carton is sometimes referred to herein as an "overlap" carton. The particular cartons with which the invention is concerned, upon closure of the same, therefore, have an area of opposed facing relationship between the outer flap and the inner flap or flaps in the area of overhang of the intermediate flap by the outer flap, and carry adhesive which is provided and activated in place at least in the said area of overhang, but which adhesive is substantially and usually completely absent from the exterior exposed faces of the sealed carton.

Numerous cartons have been proposed and adopted in practice which are provided on at least one end with closure flaps, adapted to be folded over and adhesively secured. In many instances, the carton is provided with similar flaps at both ends. In such cartons, at one or both ends, a carton closure is formed by adhesively securing flaps which lie with the surface of one flap upon the surface of another flap, with certain of the flaps presenting free or cut edge surfaces along opposite edges of the closure. This is true whether the shape of the carton is conventionally square or rectangular, or triangular, pentagonal, or hexagonal in its configuration, or any one of numerous additional shapes in which such type cartons are already known or can be made. Such types of cartons may be sealed by conventional gluing, and in some cases may be provided with hot melt or other adhesives on the inner surfaces of the outer or intermediate flaps, for sealing of the carton upon the application of heat and/or pressure thereto. Other cartons of this type have been conventionally sealed with glue and have thereafter been dipped in molten paraffin or other wax, wax and rubber mixtures, or other sealing and proofing substances, for purposes of proofing and sealing the ends of the cartons against water-vapor transmission, since it is at the carton ends where closure is effected by folding the flaps upon each other that the greatest leakage is likely to occur. While there can be no question about the initial proofness or seal of cartons which are wax-dipped, this is indeed an untidy and uneconomic operation and not one which can readily be accomplished in or in conjunction with rapidly-moving packaging equipment, naturally involving at least one additional step after completion of the usual packaging operation, depending upon whether the entire carton is dipped as a whole or whether the ends are dipped separately. In addition, dipped cartons are subject to abrasion or rupture of the coating material not only throughout the entire coated area but especially along free edges of flaps, and rupture of the coating material along a surface or edge of the carton adjoining any area of overlap of one flap by another flap also tends to rupture coating material collected therein due to stresses on the exposed coating which are conveyed from the exterior via the integral mass of coating material.

Moreover, wax dipped or coated cartons leave much to be desired by way of their appearance and, in handling, considerable amounts of coating provided by a dipping, painting, or spraying operation frequently chip off and cause displeasure, discomfort, annoyance and an unsightly appearance when coming into contact with the contained product or with hands, clothing, or personal effects of the consumer.

Attempts are therefore made to avoid dipping operations wherever possible, and resort has been had to overwrapping of cartons and/or to innerwrapping of products contained therein to obviate its use. Although satisfactory in many applications, these approaches also involve separate steps or operations and leave much to be desired.

It would be highly desirable to have available a carton which could be rapidly and effectively sealed, especially on rapidly-moving carton erecting and filling equipment as ordinarily employed in the packaging industry, which would be equally adaptable to both leakproof and nonleakproof closures, and which would, when a proofed or even hermetically sealed carton was desired, not be subject to the disadvantages attendant upon the use of previous procedures including innerwrapping, overwrapping, or dipping.

It is therefore an object of the present invention to provide cartons which carry on the materials of their construction or as an indigenous part thereof their own sealing adhesive, and which are not subject to any of the disadvantages hereinbefore mentioned. Another object of the present invention is to provide cartons which are sealable by heat and/or pressure or the like to provide a more satisfactory seal of the closure flaps than previously attained by known methods or possible with previously known cartons of the same or similar type, and in which the intermediate flap underlying the outer flap is completely sealed off from contact with the exterior. An additional object is to provide edge-sealing cartons which upon sealing by the application of heat and/or pressure do not bow in because of the application of heat and/or pressure as is commonly experienced with such type sealing cartons. A further object of the invention is to provide such cartons which seal readily and effectively upon the application of heat and/or pressure due to the fact that, especially when heat is employed, only one layer of carton thickness must be penetrated to effectuate the edge seal. A still further obpect of the invention is the provision of carton blanks from which such cartons are produced, and still an additional object is the provision of such carton blanks and cartons formed therefrom which are characterized by an area of overlap between the outer and intermediate carton flap closure members and in which the adhesive necessary for the sealing of such cartons is either carried by the material of construction of said flaps or indigenous thereto and adapted to be disposed in place at least in the area of overlap of the intermediate flap by the outer flap of the carton and activated upon the application of either heat or pressure or both. A further object is the provision of a novel method of sealing such cartons as aforesaid. Other objects of the invention will become apparent to one skilled in the art and still other objects of the invention will become apparent hereinafter.

It has now been found that the foregoing and additional objects of the invention are accomplished by the provision of carton blanks and cartons formed therefrom, in which the intermediate closure flap is recessed, relieved, or cut away at its edges with reference to the top or outer closure flap, and in which the top and/or inner flap or flaps (which inner flap or flaps when folded in closing the carton will lie beneath the intermediate flap) are provided with a coating of thermoplastic, heat-sealing, or pressure-sensitive adhesive at least in the area in which the outer flap overhangs the intermediate flap of the carton upon carton closure. The adhesive may also be carried within the material of construction of the said intermediate flap and adapted to be extruded outwardly upon the application of heat or heat and pressure and this latter embodiment, in which the adhesive is a thermoplastic adhesive laminant disposed within the intermediate flap member, constitutes a preferred embodiment of the invention. An especially preferred embodiment of the invention resides in such latter type of heat-sealing arrangement wherein the entire carton body is constructed of laminated sheet material and in which the closure is effected by extrusion of the heat-sealing thermoplastic laminant adhesive from the recessed cut edges of the intermediate flap of the carton in the area of overhang of said intermediate flap by the outer flap.

I have discovered that by providing a novel combination of a carton blank wherein the edges of the intermediate closure flap are recessed, a carton structure is provided which, when erected and closed, is characterized by a recess along opposite sides of the closure, and whereby, upon closing of the carton, the face of the outer flaps comes into opposing relationship with the inner flap or flaps along the recessed edges of the intermediate flap and that, by providing in addition to the said area of overhang an adhesive, either carried on the surface of one or more of said opposing flaps at least in the said area of overhang or adapted to be provided in said area of overhang by extrusion from the recessed edges of said intermediate flap, and in any case adapted to be activated upon the application of adhesive-activating conditions, such as heat and/or pressure, the outer or top flap is sealed directly to the inner flap or flaps in the said area of overhang, thereby also sealing off the cut edges of the recessed intermediate flap, without substantially any of the said adhesive coming into contact with or being disposed or present on the exposed exterior faces of the carton. This enables employment of the carton in ordinary packaging equipment and provides a rapid and effective means of sealing the same by the mere application of heat and subsequent cooling in the case of the thermoplastic or heat-sealing adhesives, either along or together with pressure, or the application of pressure alone in cases where pressure-sensitive adhesives are employed.

Another obvious advantage of the invention is its economy, in that only so much adhesive is employed as is required to effectuate the seal, especially significant where leakproof cartons are in question, in which case the saving in both time and materials as contrasted to dipping is clearly apparent.

The process of heat sealing the edges of the carton by extrusion of adhesive from the recessed edges of the intermediate flap is particularly advantageous in that it obviates the use of a mandrel for sealing. The number of cartons which can thus be heat sealed in a given time is greatly increased over that previously attainable in view of the fact that the maximum number of cartons which can be sealed per minute using a mandrel is about ninety, while on standard packaging machinery without the necessity of employing a mandrel the number of cartons which can be sealed per minute is on the order of four hundred. In addition, heat-sealing by effecting a caulking from the cut edges of a recessed intermediate flap, by the extrusion of thermoplastic laminant adhesive therefrom, not only presents a clearly novel concept in the edge sealing of cartons generally, but also provides an effective method of sealing the cut edges of the intermediate flap, and is moreover characterized by the absence of warping or bowing of the carton which is frequently encountered using heat-sealing cartons and especially when sealing without a mandrel is attempted.

Elimination of warping or bowing can also be effected by the provision of a satisfactory thickness of thermoplastic adhesive on one or more of the opposed surfaces of the outer and inner flaps in the area of overhang of the intermediate flap by the top or outer closure flap, said combined thickness preferably being at least about as great as that of the intermediate flap and at any rate at least as great as the space separating the outer flap from the inner flap or flaps.

For purposes of further illustrating the invention, when a carton is closed and adhesively secured according to ordinary practice, an intermediate flap lies above at least one, and usually above a pair, of shorter flaps and is covered by an outer flap. The intermediate and outer flaps present cut edges at opposite sides of the carton closure, which are usually coterminous since the intermediate and outer flaps are ordinarily of equal width. Under ordinary circumstances, the adhesive used in retaining the flaps in their closed positions may or may not be relied upon to effect a sealing of the carton, but for a leakproof condition the product is ordinarily inner-wrapped, or the carton dipped or over-wrapped. If dipped, sprayed, or painted, as already pointed out, a very slight rupture of the thin skin of wax or other material employed destroys the sealed character of the container even in crevices or cracks where, as already pointed out, the coating material is dependently subject to rupture upon rupture of the integral carton coating at the exterior of the carton adjacent thereto. This is not the case with the method and products of the present invention, since the adhesive sealing medium is retained entirely or substantially entirely within the recess bridging the gap between the outer flap and the inner flap and uniting them together in sealed relationship, and thus the bond between them in the area of overlap is considerably less subject to rupture from the application of forces to the outer faces of the carton adjacent thereto, where according to the present invention no or substantially no adhesive exists.

According to the invention, the thickness of the sealing adhesive provided in situ in the recess between the outer flap and the inner flap or flaps is sufficient to provide strength and resistance to handling and scuffing so that abrasions normally expected during use cannot destroy the seal which effectively bonds the inner surface of the outer closure flap to the upper surface of the inner flap or flaps, adhesive thickness being ordinarily equivalent to the thickness of the space separating the outer flap from the inner flap.

Reference is now made to the accompanying drawings which show exemplary embodiments of certain carton blank and carton constructions and arrangements of parts which may be employed according to the present invention without any limitation of the invention thereto, wherein the same numerals refer to the same parts, similar parts of different figures are denoted by like numbers except for a hundred place digit, and wherein.

Figure 1:
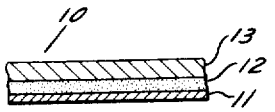
FIGURE 1 is an enlarged cross-sectional view of a portion of a laminated sheet material which is one type of sheet material utilizable according to the invention.

Referring now to the drawings, FIGURE 1 is an enlarged cross-sectional view of a portion of a laminated sheet material 10, which is one form of sheet material utilizable in constructing cartons according to the present invention, as it might be formed by laminating a fifty pound per ream (24 x 36—500) 0.0035 inch thick dry waxed paper sheet 11 to a .012 inch thick paperboard sheet 13 with .0065 inch of thermoplastic laminating adhesive 12.

Figure 2:
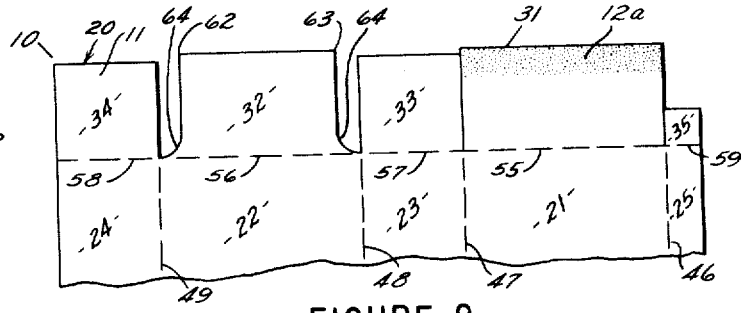
FIGURE 2 is a partial plan view showing the inside or heat sealing side of a carton blank embodying the present invention.

FIGURE 2 is a partial plan view of the inner or heat-sealing side of a carton blank 20 of generally rectangular dimensions cut from laminated sheet material 10 with thinner or paper ply 11 facing the viewer. The carton blank 20 includes rectangular front face panel 21, back face panel 22, and right hand and left hand end panels 23 and 24. The blank also includes front top flap 31, back top flap 32, and right hand and left hand end flaps 33 and 34. Also seen in FIGURE 2 are glue flap 25 and its extension 35. Face and end panels 21 through 24 are all integral and joined to each other along parallel transverse score lines 47 through 49, and front face panel 21 is also integral with and joined to glue flap 25 along parallel transverse score line 46. Face and end panels 21 through 24 are all integral with and joined to their respective top flaps 31 through 34 along longitudinal score lines 55 through 58. Extension 35 is integral with and joined to glue flap 25 along score line 59, which is an extension of longitudinal score lines 55 through 58, all of which are extensions of each other. Transverse cuts are provided between the edge of blank 20 and the longitudinal fold line formed by score lines 55 through 59 between front top flap 31 and end flap 33, between front top flap 31 and extension 35, and between back top flap 32 and end flaps 33 and 34, to permit all flaps to be folded inwardly at right angles with respect to their adjacent panels. Back top flap 32 is recessed or cut away at its lateral edges 62 and 63 so as to be of diminished width with respect to front top flap 31 at its longitudinal edge and is further provided with a curved reach in each of its lateral edges as at 64 so as to impart a full width to back top flap 32, equivalent to the width of back face panel 22, at its juncture therewith along score line 56. Back top flap 32 by virtue of its recessed edges and diminished width is therefore not only of diminished width but also area with respect to front top flap 31, which will accordingly overhang flap 32 at its lateral edges when the carton is erected and closed. As shown, top flap 31 carries a layer of thermoplastic adhesive 12a in the area bordering its longitudinal edge for sealing of this edge to the upper surface of flap 32 adjacent score line 56.

Figure 3:
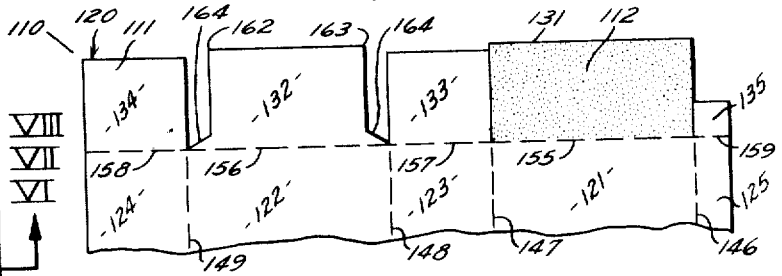
FIGURE 3 is a partial plan view of the heat-sealing side of another carton blank embodying the invention.

FIGURE 3 is a partial plan view of another form of carton blank embodying the invention. This carton blank 120 is constructed from single-ply paperboard sheet material 110, of which inner or heat-sealing side 111 is shown facing the viewer. The blank is similar to that shown in FIGURE 3, being provided with rectangular face and end panels 121 through 124, top flaps 131, through 134, glue flap 125 and extension 135, parallel transverse score lines 146 through 149 along which all the various panels and glue flaps are both integral and joined, and longitudinal score lines 155 through 158 along which the top flaps are joined to their respective panels and 159 along which extension 135 is joined to glue flap 125, said score line 159 being an extension of score lines 155 through 158, all of which are extensions of each other. The blank is provided with transverse cuts between the edge and the longitudinal fold line formed by score lines 155 through 159 between top flaps 131 and 133, between top flap 131 and extension 135, and between back top flap 132 and end flaps 133 and 134, to allow the various flaps to be folded inwardly at right angles with respect to their adjacent panels. Back top flap 132 is again of diminished width and area with respect to front top flap 131, being recessed at its edges 162 and 163 and being angled along each of said edges at 164, so as to be of such diminished width throughout substantially its entire lateral reach except at its juncture with back face panel 122 along score line 156. Front top flap 131 is shown provided with a layer of thermoplastic adhesive 112 throughout substantially its entire area.

FIGURE 4 is again a partial plan view of a carton blank 220, in accord with the invention, very similar to that shown in FIGURES 2 and 3, except that it is formed from a two-ply paper-paperboard sheet material 210, the thinner or paper ply 211 of which faces the viewer and the thicker or paperboard ply 213 of which is not shown. Face and end panels 221 through 224 of rectangular nature are integral with and joined to each other along parallel transverse score lines 247 through 249 and glue flap 225 is integral with and joined to front face panel 221 along score line 246. Top flaps 231 through 234 are all joined to their respective face and end panels 221 through 224 along longitudinal score lines 255 through 258 and glue flap 225 is integral with and joined to its extension 235 along score line 259, said score line 259 being an extension of score lines 255 through 258, all of which are extensions of each other. Transverse cuts are provided from the edge of the blank to the longitudinal fold line formed by score lines 255 through 259 between top flaps 231 and 233, between top flap 231 and extension 235, and between back top flap 232 and end flaps 233 and 234, to allow the flaps to be folded inwardly at right angles with respect to their adjacent panels. Back to flap 232 is of diminished width and lateral reach with respect to front top flap 231, being recessed at each of its edges 262 and 263 as indicated at 264 so as also to be of diminished area with respect to top flap 231, which will accordingly overhang flap 232 at three edges, in particular each of lateral edges 262 and 263 to the extent indicated by 264, when the carton is erected and closed. Back top flap 232 is likewise of diminished width with respect to its adjacent back face panel 222 with which it is integral and joined along score line 256. Front top flap 231 is shown provided with a coating of thermoplastic adhesive 212 in the areas immediately adjacent its lateral and longitudinal edges, so as to leave only a central area immediately adjacent front face panel 221 along score line 255 without such coating 212.

Figure 5:
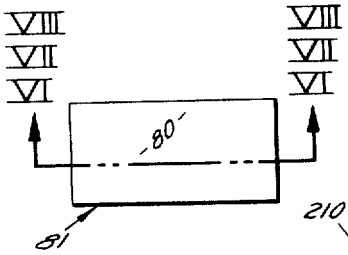
FIGURE 5 is a top or bottom view of any erected and sealed carton constructed in accord with the invention.

FIGURE 5 is a top or bottom view of any erected and sealed carton constructed in accord with the invention and is included solely for purposes of providing a line upon which the cross-sectional views of subsequent figures may be taken. When viewed as in FIGURE 5, an erected and sealed carton according to the present invention has substantially no different appearance than any other conventional carton, the top or bottom 80 and front face panel 81 of any such carton being shown and indicated in FIGURE 5.

Figure 6:
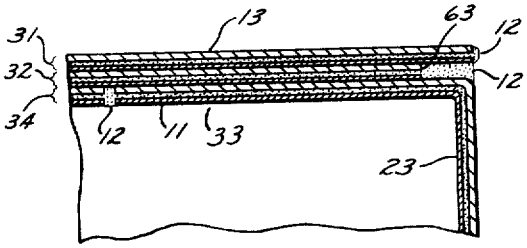
FIGURE 6 is an exaggerated cross-sectional view on line VI—VI of FIGURE 5, considering FIGURE 5 a top view, showing one form of the erected and sealed carton, having been erected from the carton blank of FIGURE 2.

FIGURE 6 is an exaggerated partial cross-sectional view on line VI—VI of FIGURE 5, considering FIGURE 5 a top view, showing one version of an erected and sealed carton embodying the invention, having been erected from the carton blank of FIGURE 2 and sealed by the application of heat or heat and pressure. As viewed in FIGURE 6, front top flap 31, back top flap 32, and end flaps 33 and 34 are visible. Front top flap 31 overlies back top flap 32 which in turn overlies end flaps 33 and 34. Right hand end panel 23 is shown attached to end flap 33. Thermoplastic laminant adhesive 12 has extruded outwardly from the recessed edge 63 of back top flap 32, thereby forming a bond of thermoplastic adhesive laminant 12 directly between bottom ply 11 of top flap 31 and top ply 13 of end flap 33 in the area of overhang, and also sealing off the cut edge 63 of back top flap 32 against wicking. Extension of thermoplastic laminant adhesive 12 out of the cut edge of front top flap 31 has also sealed off the plies of sheet material at this cut edge against wicking.

Figure 7:
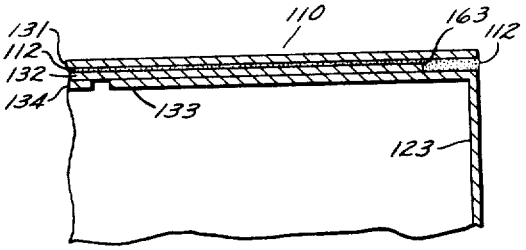
FIGURES 7 and 8 are exaggerated cross-sectional views on lines VII—VII and VIII—VIII of FIGURE 5, respectively, considering FIGURE 5 a top view, showing other forms of the erected and sealed carton embodying the invention, having respectively been erected from the carton blanks of FIGURES 3 and 4.

FIGURE 7 shows an exaggerated partial cross-sectional view on line VII—VII of FIGURE 5, considering FIGURE 5 a top view, of another carton erected and sealed by the application of heat or heat and pressure, this time having been erected from the carton blank of FIGURE 3. As viewed in FIGURE 7, front top flap 131 of single-ply sheet material 110 overlies back top flap 132 and is adhered thereto by layer of thermoplastic adhesive 112 carried thereon, while back top flap 132 in turn overlies end flaps 133 and 134. Right hand end panel 123 is shown attached to adjacent end flap 133. Thermoplastic adhesive 112 coated on front top flap 131 bonds said flap to end flap 133 in the area of overhang of back top flap 132 by top flap 131 which exists due to recessed edge 163 of back top flap 132, also sealing off cut edge 163 against wicking. Thus, an integral bonding between front top flap 131 and end flap 133 has been effected.

Figure 4:
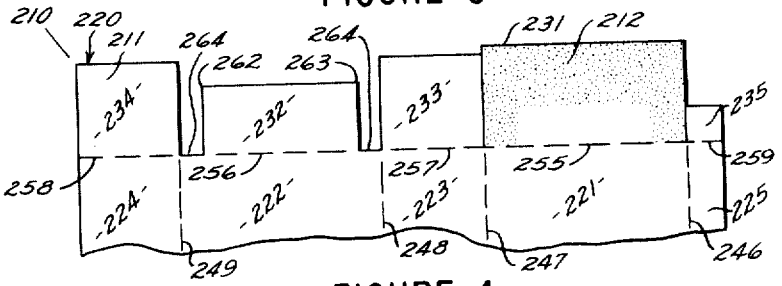
FIGURE 4 is a partial plan view of the heat-sealing side of a further carton blank embodying the invention.
Figure 8:
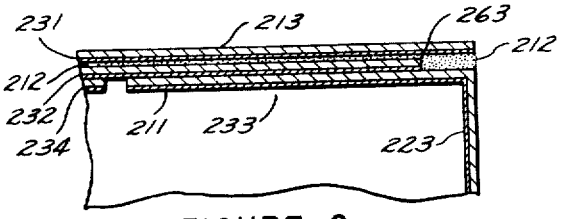

FIGURE 8 shows an exaggerated partial cross-sectional view on line VIII–VIII of FIGURE 5, considering FIGURE 5 a top view of, another form of carton erected from the carton blank of FIGURE 4 and sealed by the application of heat or heat and pressure. As viewed in FIGURE 8, front top flap 231 overlies back top flap 232 and is adhered thereto by thermoplastic adhesive 212. Back top flap 232 in turn overlies end flaps 233 and 234, which latter is integral with and joined to right hand end panel 223, also shown. Since the material of construction in this case involves paper ply 211 and paperboard ply 213, both plies are shown. Thermoplastic adhesive 212 coated on inner ply 211 of front top flap 231 forms a direct bond to the upper ply 213 of end flap 233 in the area of overhang of back top flap 232 by front top flap 231 which exists because of recessed edge 263 of back top flap 232. The thermoplastic adhesive 212 in the area of overhang also effectively seals off cut edge 263 of back top flap 232 against wicking.

In operation, a carton blank is first produced from suitable carton stock, such as paper or paperboard or the like, and preferably, but not necessarily, of laminated sheet materials such as shown in FIGURE 1, the carton blank thus produced having a configuration the same as or similar to those shown in FIGURES 2, 3 and 4. Where the adhesive is to be disposed only upon the surface of the flaps, it may be disposed upon any or all of them as previously indicated, but at any rate it will be disposed either upon the inner flap or flaps or upon the outer flap in the area of overlap of the intermediate flap by top flap, or upon both inner and outer flaps in this area. When a more complete seal is desired, and less bowing, the adhesive is disposed upon the surfaces of both end and outer flaps in the area of their opposed facing relationship in the area of overlap of the intermediate flap by the outer flap.

In order to provide sufficient adhesive in the area of overhang, advantage may be taken of the fact that adhesive applied to the upper surface of an intermediate flap or the inner surface of a top flap, or both, may be chosen of sufficient fluidity to flow, upon application of activating conditions, to the space provided between the top and inner flaps in the area of overhang of the intermediate flap, thereby to fill this space. Moreover, the inner flap may be, and in some cases preferably is, shortened so as to correspond upon folding with the contour of the recessed edge of the intermediate flap, or substantially so, or it may even be embossed or suitably contoured so as to provide a recess for the relieved edge of the intermediate flap where said inner flap underlies the said intermediate flap, whereby the opposed surfaces of the inner and outer flaps are brought closer together.

When laminated sheet material is employed, the adhesive is provided in the area of overlap by extrusion from the recessed edges of the intermediate flap to a sufficient thickness so that bowing is not experienced. For some purposes, such as tacking of a carton, it is entirely sufficient that the seal be present only in the area of overlap. For other purposes requiring more complete sealing, adhesive is also disposed on the inner ply of the top or outer flap, as shown in FIGURE 2, or a thermoplastic or heat-sealing or pressure-sensitive adhesive may be distributed upon a part or all of the surface of the intermediate recessed flap which will be upwardly disposed upon closing of the carton, or upon the inner surface of the outer flap which will be inwardly disposed upon closureof the carton, but will ordinarily be disposed only on the surfaceof the intermediate flap adjacent the score line along which the intermediate flap adjoins its face panel, or along the outer edge of the outer flap, so as to effectively provide a seal between the intermediate flap and the top flap adjacent the score line along which the intermediate flap adjoins its face panel upon the application of heat or heat and pressure. Although the adhesive employed for interfacial bonding of the intermediate and top flaps is usually of considerably less thickness than the thickness of the laminant in the laminated sheet material employed, this is not critical since, upon sealing by extrusion of thermoplastic adhesive from the recessed edges of the intermediate flap, especially when heat and pressure are employed, the thickness of the intermediate flap is somewhat reduced and the extruded adhesive in the recessed area readily attains a thickness approximating that of the somewhat flattened intermediate flap.

The basic seal between the surfaces of the recessed intermediate flap and the outer flap, where required, may in some cases even be effected by the employment of conventional glue, leaving the sealing between the outer flap and the inner flap or flaps in the area of overhang to be effected by the application of heat and/or heat and pressure to cause extrusion of the laminant from the recessed edges of the intermediate flap, or by activation of surface-carried adhesive in the area of overhang. When present in areas other than the area of overhang, the thickness of any adhesive on the surface of any flap or flaps is preferably but not necessarily of a considerably lesser thickness than the combined thickness of surface-carried adhesive in the area of overhang, when surface carried adhesives are employed.

After provision of the carton blank with suitably disposed adhesive, either carried by or disposed within the material of construction of the intermediate flap, a suitable carton body is erected from the carton blank in the usual manner by securing an end and face panel thereof to form a tube, and the carton then closed by folding in the end flap or flaps, folding the recessed intermediate flap in upon the end flaps, and folding the top or outer flap in upon the intermediate flap. Filling is usually effected after closure of one end of the carton. Due to the adhesive disposed in the area of overhang and usually at least also at the outer edge of the area in which the surface of the outer flap contacts the surface of the intermediate flap, the application of heat or heat and pressure to these flaps or areas produces an effective seal of the carton when the adhesive employed is thermoplastic or heat-sealing. Ordinarily the application of heat and pressure will be followed by cooling, generally under pressure contact, to prevent the flaps from springing apart until the adhesive has set or solidified, or has at least considerably increased in tack or viscosity, and in reference to "adhesive activation" provided for thermoplastic materials, I intend that a setting step be included in practice. A similar result is produced by the application of pressure when a pressure sensitive adhesive is employed, the heat and/or pressure required being only that sufficient to activate the particular adhesive employed. Adhesive-activating conditions may also be provided in selected cases by infra-red rays, dielectric heating, or application of microwaves, and in selected cases the adhesive-activating conditions may be applied just before closing all or even any of the closure flaps rather than after. When the construction involves the use of laminated sheet material, the application of heat or heat and pressure or other adhesive-activating conditions to the exposed surface of the outer flap, or to the intermediate flaps just prior to or after closing of the carton, effectively extrudes the thermoplastic adhesive laminant from the recessed edges of the intermediate flap, thereby forming a bond between the inner surface of the outer flap and the upper surface of the inner flap or flaps in the area of overhang of the intermediate flap by the outer flap. As already stated, this strong edge-seal alone may in some cases be sufficient. Where an even more effective seal is desired, the same procedure is employed except that a minimal thickness of heat-sealing or pressure-sensitive adhesive, as required in a particular case, is disposed either partially or completely on the surface of the recessed intermediate flap member which will be upwardly disposed upon closing of the carton, or upon at least a portion of the surface of the uter flap which will be inwardly disposed upon closing of the carton, or upon both said surfaces, so that upon application of heat and/or pressure an effective seal will be provided not only in the area of overlap but also interfacially between the opposed surfaces of the recessed intermediate flap and its overlying outer flap. Such areas of adhesive may be conveniently printed upon or otherwise locally applied to the selected surfaces of the carton blank. It goes without saying that the adhesive used for such interfacial sealing between the recessed intermediate flap and the outer flap should be heat-sealing and moisture-proof when a substantially leakproof or moisture-vapor proof carton is desired, which in addition requires the employment of either proofed or laminated sheet materials of construction.

It will be apparent that the thermoplastic or pressure-sensitive adhesive may also be disposed upon the surface of the inner flaps in the area of overhang of the intermediate flap by the outer flap, for example, referring to FIGURE 4, on end flaps 233 and 234 immediately adjacent score lines 257 and 258 and along the lateral edges thereof which will protrude beyond the intermediate flap 232 at its longitudinal edge upon erecting of the carton and folding intermediate flaps 233 and 234 inwardly, folding intermediate flap 232 in upon end flaps 233 and 234, and folding top flap 231 upon intermediate flap 232. It should also be apparent that such disposition of adhesive upon the surface of the inner or end flaps may be employed alone, as in a carton blank structure of FIGURE 3 or 4, or together with adhesive on the front top or outer flap as shown in either FIGURE 3 or 4, and is preferably employed in addition to the adhesive on the top or outer flap when a completely nonbowed and strongly-sealed carton is desired.

While in the drawings it is indicated that thermoplastic laminant adhesive also extrudes out of the cut edges of the innermost ply of the carton construction, and while such does ordinarily occur when sealing cartons are constructed from laminated sheet materials according to the present invention against a mandrel, it is to be understood that extrusion of the adhesive from the cut edges is optional and not a requisite for satisfactory sealing of the innermost flaps, while preferable in some instances, of the cartons produced according to or constituting the present invention. Moreover, while the drawings show carton blanks having the recessed intermediate flap attached to the back face panel of the carton, the recessed intermediate flap can equally well be attached to the front face panel of the carton and the outer flap, usually having dimensions generally approximating those of the carton end cross-section, can equally well be attached to the back face panel. Moreover, the recessed intermediate flap at one end of the carton may be attached to the front face panel while at the other end of the carton the recessed intermediate flap may be attached to the back face panel, and vice versa. In addition, the relieving, recessing, or cutting back of the edges of the intermediate flap is not restricted to any particular geometric design or form of the intermediate flap or recess, and in one embodiment, for example, the intermediate flap may simply be tapered from its juncture with its adjoining face panel to a somewhat reduced width at its outer edge.

Any or all of the sheet materials used as carton stocks may be treated in any one of various ways, such as by printing, treating for grease-proofness or wax hold-out, glossing, and the like, and such treatment will be understood to be applicable also in the case of laminated sheet material, in which case it is ordinarily applied prior to lamination of the sheet materials. Representative sheet materials include, in addition to paper and paperboard parchment papers, papers containing foil mounted thereon, grease-proof papers, glassine papers, non-woven fabrics, and the like. In any event, however, where laminated sheet materials are employed, the adhesive will normally be present in an amount of at least about fifty-five and preferably at least sixty pounds per ream (24 x 36—500). This is sufficient to provide a thickness of laminant in excess of about .004 inch. With this thickness of laminant, there is sufficient adhesive material to extrude through the recessed edges of the intermediate flap member and into the area of opposed facing relationship between the outer flap and the inner flap or flaps in the area of overlap without bowing of the carton upon sealing. This amount of laminant is also sufficient to extrude out of the cut edges of the top or outer flap thereby to effectively seal the same. However, it is to be understood that greater thicknesses of laminant, even exceeding the combined thickness of the base sheet materials, may be employed if desired.

While in general it is preferred to employ a lighter sheet for the inside ply of a laminated sheet, when employed, this is not necessarily the case, and in some applications the heavier sheet may provide the inside surface of the carton wall. At least one sheet of the laminated sheet material must have sufficient strength to provide structural rigidity, and ordinarily both sheets will have sufficient strength for this purpose and will each exceed about ten pounds per inch in tensile strength as determined by TAPPI method T404m. The thickness of the sheet materials employed in a laminated sheet material will generally range from about .002 to about .012 inch, with a thickness of laminant from about .004 inch to about .015 inch, but usually ranging from about .004 to about .008 inch. While the thickness of the sheet materials is mentioned is usually from about .002 to .012 inch, I may employ paperboard sheet material, either alone or as a part of a laminated sheet, which has a thickness as great as .03 inch.

The thermoplastic laminating adhesive employed as the laminant in such laminated sheet material may, for example, have a viscosity of at least 75, and preferably at least 150, centipoises in the range of from about ten degrees to about fifty degrees Fahrenheit above its softening point, e.g., at a temperature of about 220–270 degrees Fahrenheit, as measured by a Brookfield Synchroelectric Viscometer or other rotational viscometer at a spindle speed less than ten r.p.m. Hot melt compositions based on hydrocarbon and especially petroleum waxes are suitable, preferably those based on microcrystalline waxes. These may be increased in viscosity by admixture therewith of polymers of ethylenically unsaturated hydrocarbons, natural gums, and the like, or by addition of gelling agents, and especially by the addition of a hydrous adsorbent powder in combination with a surface activator, especially inorganic gelling agents such as hydrated attapulgite and the like together with nitrogen-containing surface activators, especially fatty-acid amides and alkyl quaternary ammonium salts. The density of the adhesive laminants employed will ordinarily be from about 12 to about 25 or more pounds per ream (24 x 36—500) per each .001 inch of thickness thereof.

As further representative carton stocks, suitable for carton blanks and cartons according to the present invention, may be mentioned the usual paper or paperboard sheets, such as made on a cylinder machine or a multiple-headbox Fourdrinier machine, having a number of plies, or heavy paper sheets having only a single ply. Generally speaking, the carton stock may be any fibrous cellulosic or synthetic sheet, but in some cases may include foils or films as one ply thereof. Aluminum foil may sometimes advantageously be used for one ply, especially when the ply is to become the inside surface of a carton. In such cases the aluminum foil may be and preferably is mounted on a light paper before gluing or laminating to a second fibrous ply, foil side in. For high moisture-vapor proofness, the carton stocks may be proofed, including for example dry waxed, semi-waxed, or surface waxed paperboard or paper materials, or polyethylene-coated materials, and the like. As pointed out hereinbefore, the cartons of the invention are preferably fabricated of laminated sheet materials, such as paperboard wax-laminated to paper, and will in general be fibrous cellulosic or synthetic sheets laminated to each other or to foils with suitable laminating materials as hereinafter described. It will be apparent that either laminated sheet materials or proofed sheet materials should be employed when a leakproof or moisture-vapor proof and especially when a hermetically sealed carton structure is desired.

As pressure-sensitive adhesives, which may be used in accord with the present invention, may be mentioned various elastomers including natural and synthetic rubbers, chlorinated rubbers, chlorinated polyethylene, vinyl acetate, and the like, which may be suitably modified with various resins and plasticizers, all according to conventional knowledge and procedure of the art. These adhesives in some cases will not be normally pressure sensitive, but will become so upon application of heat or other activating conditions.

As thermoplastic laminant for uniting the plys of laminated sheet materials which may be employed in producing the carton blanks and cartons of the present invention, the so-called hot-melt adhesives are preferred. Moisture-vapor-proof hot melts based on petroleum waxes are preferable, as these have a high degree of plasticity and flexibility. Hot melts based on micro-crystalline wax are especially preferred. Additional representative laminant adhesives include (A) microcrystalline waxes of any origin, e.g., Louisiana, Pennsylvania, or Mid-Continent origin, and/or paraffin waxes modified with: (1) synthetic polymers such as butyl rubber, polyisobutylene, polyethylene, copolymers of vinyl acetate and ethylene, (2) aluminum stearate, (3) hydrophilic adsorbents, (4) surface activators, (5) terpene resins, (6) ester gums, (7) rosin derivatives, and the like; (B) low molecular weight polymers such as (1) polystyrene of 4,000 to 20,000 M.W., (2) polyethylene of 2,000 to 12,000 M.W., (3) polyterpenes, (4) isoprene polymers, (5) chlorinated natural and synthetic rubbers, (6) natural rubbers, and the like; (C) cellulose derivatives such as (1) ethyl cellulose compositions and mixtures thereof with resins, waxes and plasticizers, (2) nitrocellulose thermoplastics, (3) cellulose acetates or other esters and mixtures thereof with resins and the like; all of which may be suitably modified with various other resins and with plasticizers, according to conventional knowledge and procedure of the art.

As heat-sealing adhesives suitable for surface disposition may be mentioned the various thermoplastic hydrocarbon waxes, especially petroleum waxes, of paraffinic or microcrystalline nature, hydrocarbon polymers such as polystyrene or polyethylene, ethyl cellulose hot melts, polyterpenes, rosin derivatives, and the like, which may again be suitably modified with various resins and plasticizers, all according to conventional knowledge and procedure of the art.

Evidencing the typical superiority of representative edge-seal cartons of the present invention, the following test was conducted. Carton blanks were cut and scored on a press to give exact duplicates, except that one set of carton blanks was provided with a recessed intermediate flap while the other set had a full intermediate flap. The cartons erected therefrom were of equal dimensions, 5½ inches by 3 inches by 1⅝ inches, and were in all respects the same, except for the said recessed edge of the intermediate flap in the one set of cartons. The material of their construction was a representative laminated stock consisting of seventy pound coated Fourdrinier paper laminated to a fifty pound dry-waxed Fourdrinier paper with eighty-five pounds per ream of the following wax composition:

(a) 3% hydrogenated tallow amides containing 22% hexadecanamide, 75% octadecanamide, 3% octadecenamide (Armid HT)

(b) 10% powdered attapulgite having a particle size between .02 and two microns, an average particle size of about .14 micron, and a 17% moisture content (Attagel 20)

(c) 87% Pennsylvania grade microcrystalline wax, M.P. 150–160° F. (Quaker State L-500)

After erection of the cartons, their bottom flaps were glued shut with moistureproof polyvinyl acetate-based adhesive. Fifty cubic centimeters (approximately fifty grams) of anhydrous calcium chloride was placed in each of the cartons and the top flaps closed. The cartons having the recessed intermediate flap were glued and their ends heat sealed, while the cartons having corresponding full glue flaps were glued. Moistureproof polyvinylacetate-based adhesive was employed in both cases.

The end heat-sealed cartons having the recessed intermediate flaps and the cartons having glued full intermediate flaps were tested by storing under conditions of fifty percent relative humidity and the rate of their weight gain measured. The average rate of weight gain of five boxes having the recessed intermediate flap and heat-sealed at their ends was .056 gram per day per box. The average rate of weight gain of five boxes having the full glue flap was .099 gram per day per box. The cartons end-sealed according to the present invention were therefore approximately twice as effective in preventing moisture-vapor transfer as the corresponding cartons made from identical sheet material but having a full intermediate flap instead of a recessed intermediate flap.

It is thus seen that the present invention provides a method of forming a sealed carton which includes the steps of providing a carton body having a series of end closure flaps including an outer flap, an intermediate flap recessed along an edge thereof so as to be narrower in breadth than the outer flap along at least a portion of an edge thereof, and so as to provide an area of overhang of said intermediate flap by said outer flap when said flaps are folded upon each other upon closing of the carton, at least one and usually two inner flaps which provide a surface for opposed facing relation with said outer flap at a point where said intermediate flap is of diminished breadth with respect to the outer flap, providing at least one of said flaps with an adhesive adapted to be disposed in place at least in said area of overhang (or opposed facing relationship) and to be activated upon the application of adhesive-activating conditions to the carton exterior, folding the said inner flap or flaps first, folding the intermediate flap into overlying relation upon said inner flap or flaps, and folding the outer flap into overlying relation upon said intermediate flap, whereby the surface of the outer flap comes into opposed facing relation with the surface of at least one inner flap in the area of overhang, applying adhesive-activating conditions, optionally followed by adhesive setting conditions, to the flaps, preferably to the exterior of the carton after closing, and most conveniently to the outer flap thereof, to effectively seal said outer flap to said inner flap or flaps interfacially in said area of opposing facing relationship and thereby also seal off the recessed edge of the intermediate flap. In its broader sense, the present invention also provides carton blanks, cartons formed therefrom, and sealed cartons, having enclosed body walls in articulation and end closure flaps articulated to the said body walls, which said end closure flaps are adapted to be folded in sequence to form a plural layered closure in which the flaps lie in engagement with the surface of one flap upon the surface of another flap, one of said flaps being an outer flap usually but not necessarily generally dimensioned to cover the entire end cross-section of the carton body, another of the said flaps being an intermediate flap also usually generally dimensioned to cover the entire end cross-section of the carton body but in any event having edge portions where the same would ordinarily be exposed in the closed carton slightly recessed so as to extend inwardly of the corresponding edges of the outer flap, thereby forming one or more recesses or areas of overhang in said closure adapted to be filled with adhesive, and an adhesive carried by at least one of said flaps and adapted to be disposed in said areas provided upon folding of the carton closure flaps and activated in place therein upon the application of adhesive-activating conditions. Preferably the adhesive adapted to be disposed and activated in place in said areas is carried as the thermoplastic laminating adhesive between plies of the laminated intermediate flap, and extrudes outwardly of the recessed edge of the intermediate flap upon the application of heat or heat and pressure to the flaps, usually to the carton exterior and most conveniently to the outer flap thereof, to later congeal and thereby effect a seal between the surface of the outer flap and the surface of the inner flap by means of said extruded thermoplastic adhesive laminant, thereby also sealing off the cut edge of the said intermediate flap without disposing any or substantially any of the thermoplastic laminant adhesive upon the exterior exposed faces of the carton.

It is to be understood that the invention is not limited to the exact details of construction, operation, or exact materials shown and described, as obvious modifications and equivalents will be apparent to one skilled in the art, and the invention is therefore to be limited only by the scope of the appended claims.

I claim:

1. A carton blank having at least one series of end closure flaps, including an inner flap, *a full outer flap, and* an intermediate flap *hingedly connected to a panel of said carton positioned opposite to the panel to which said outer flap is connected when said carton is erected* [and an outer flap,] said flaps being adapted to be folded in sequence upon erecting a carton from said blank and closing of the same to provide a plural layered closure in which the flaps lie with the surface of one flap upon the surface of another flap, said intermediate flap being recessed along *at least one* [an] edge thereof so as to be narrower than said outer flap along at least a portion of *at least one* [an] edge thereof, and so as to provide an area of overhang of said intermediate flap *along at least one transverse side thereof perpendicular to its fold line* by said outer flap when said flaps are folded upon each other upon closing of the carton, *said intermediate flap being of approximately the same dimensions as said outer flap except for recessed area,* said inner flap providing a surface for opposed facing relation with said outer flap adjacent the fold line of said inner flap in said area of overhang upon erection of a carton from said blank and closing of the same, at least one of said flaps being provided with adhesive adapted to be disposed and activated in said area of overhang upon the erection of a carton from said blank and closing and sealing thereof by the application of adhesive-activating conditions to the flap carrying said adhesive, the amount of said adhesive being sufficient to secure said outer flap to said inner flap in said area of overhang.

2. A carton blank accoring to claim 1, wherein the adhesive is selected from heat-sealing, thermoplastic, and pressure-sensitive adhesives, and is carried on the surface of at least one of the outer and inner flaps in the area of their opposed facing relationship in a carton erected from said blank.

3. A carton blank of laminated sheet material in which the laminant is a thermoplastic adhesive laminant, said blank having at least one series of end closure flaps including an inner flap, an intermediate flap, and an outer flap, said flaps being adapted to be folded in sequence upon erecting a carton therefrom and closing of the same to provide a plural layered closure in which the flaps lie with the surface of one flap upon the surface of another flap, said intermediate flap being recessed along an edge thereof so as to be narrower than said outer flap along at least a portion of an edge thereof, and so as to provide an area of overhang of said intermediate flap by said outer flap when said flaps are folded upon each other upon closing of the carton, said inner flap providing a surface for opposed facing relationship with said outer flap adjacent the fold line of said inner flap in said area of overhang upon erection of a carton from said blank and closing of the same, said thermoplastic adhesive laminant in said intermediate flap being sufficient and adapted to be extruded through the recessed edge thereof into said area of overhang upon the erection of a carton from the said blank and closing and sealing thereof by the application of thermoplastic laminant adhesive-activating conditions to said intermediate flap and allowing the said laminant to congeal.

4. A carton blank according to claim 3, wherein the thickness of the layer of adhesive laminant in the laminated sheet material from which the carton blank is constructed is at least about .004 inch.

5. A carton blank according to claim 3, wherein the thermoplastic adhesive laminant of the laminated sheet material from which the carton is constructed is present in an amount of at least about fifty-five pounds of laminant per ream of sheet material.

6. An erected and sealed carton including a carton body having a series of closure flaps at an end thereof, including an inner flap, *a full outer flap, and* an intermediate flap *hingedly connected to a panel of said carton positioned opposite to the panel to which said outer flap is connected,* [and an outer flap,] said flaps being folded to provide a plural layered closure in which the flaps lie with the surface of one flap upon the surface of another flap, said intermediate flap being recessed along *both* [a] side *edges* [edge] thereof so as to be narrower than said outer flap along at least a portion of *both* [a] side *edges* [edge] thereof, and so as to provide an area of overhang of said intermediate flap by said outer flap *along both transverse sides thereof perpendicular to its fold line, said intermediate flap being of approximately the same dimensions as said outer flap except for recessed area,* said inner flap providing a surface for opposed facing relation with said outer flap adjacent to the fold line of said inner flap in said area of overhang, and an adhesive in said area of overhang interfacially bonding said inner flap to said outer flap and sealing off the recessed *edges* [edge] of said intermediate flap, said adhesive being provided in said area of opposed facing relationship and being substantially absent from the exterior exposed faces of the carton.

7. A carton according to claim 6, wherein the adhesive is selected from heat-sealing, thermoplastic, and pressure-sensitive adhesives, and is carried on the surface of at least one of the outer and inner flaps in the area of their opposed facing relationship.

8. A carton according to claim 6, wherein additional adhesive is provided interfacially between said intermediate and top flaps.

9. An erected and sealed carton of laminated sheet material in which the laminant is a thermoplastic adhesive laminant, including a carton body having a series of closure flaps at an end thereof, including inner flaps, *a full outer flap, and* an intermediate flap *hingedly connected to a panel of said carton positioned opposite to the panel to which said outer flap is connected,* [and an outer flap,] said flaps being folded to provide a plural layered closure in which the flaps lie with the surface of one flap upon the surface of another flap, said intermediate flap being recessed along both side edges thereof so as to be narrower than said outer flap along at least a portion of both side edges thereof, and so as to provide an area of overhang of said intermediate flap by said outer flap on both sides thereof *perpendicular to its fold line, said intermediate flap being of approximately the same dimensions as said outer flap except for recessed areas,* said inner flaps providing a surface for opposed facing relation with said outer flap in said areas of overhang, and an adhesive in said *area* [areas] of opposed facing relationship interfacially bonding said inner flap to said outer flap adjacent the fold lines of said inner flaps and sealing off the recessed edges of said intermediate flap, said adhesive comprising thermoplastic laminant adhesive carried between the plies of sheet material of said intermediate flap and extruded outwardly from the recessed edges of said intermediate flap and thus provided in said *area* [areas] of opposed facing relationship, said thermoplastic adhesive laminant being substantially absent from the exterior exposed faces of the carton.

10. A carton according to claim 9, wherein the thickness of the layer of adhesive laminant in the laminated sheet material from which the carton is constructed is at least about .004 inch.

11. A carton according to claim 9, wherein the thermoplastic adhesive laminant of the laminated sheet material from which the carton is constructed is present in an amount of at least about fifty-five pounds of laminant per ream of sheet material.

12. A carton according to claim 9, wherein additional adhesive is provided interfacially between said intermediate and top flaps.

13. An erected and sealed carton of laminated sheet material in which the laminant is a thermoplastic adhesive laminant, including a carton body having a series of closure flaps at an end thereof, including an inner flap, an intermediate flap, and an outer flap, said flaps being folded to provide a plural layered closure in which flaps lie with the surface of one flap upon the surface of another flap, said intermediate flap being recessed along an edge thereof so as to be narrower than said outer flap along at least a portion of an edge thereof, and so as to provide an area of overhang of said intermediate flap by said outer flap, said inner flap providing a surface for opposed facing relation with said outer flap in said area of overhang, and adhesive in said area of opposed facing relationship interfacially bonding said inner flap to said outer flap and sealing off the recessed edge of said intermediate flap, substantially filling said area of overhang, and being substantially absent from the exterior exposed faces of the carton.

14. An erected and sealed carton of laminated sheet material, comprising a carton body having a series of closure flaps at one end thereof, including an inner flap, an intermediate flap, and an outer flap, said flaps being folded to provide a plural layered closure in which the flaps lie with the surface of one flap upon the surface of another flap, said intermediate flap having a cut-away portion so as to provide an area of opposed facing relation between said inner flap and said outer flap, and a thermoplastic adhesive in said area of opposed facing relation interfacially bonding said inner flap to said outer flap and sealing the cut edge of said intermediate flap, said adhesive having been carried between the plies of the sheet material of said intermediate flap and having been extruded from the cut edge of said intermediate flap and thus having been provided in said area of opposed facing relation, said adhesive being substantially absent from the exterior exposed faces of the carton.

References Cited

The following references, cited by the Examiner, are of record in the patented file of this patent or the original patent.

UNITED STATES PATENTS

| | | |
|---|---|---|
| 2,341,845 | 2/1944 | Mark. |
| 2,348,687 | 5/1944 | Abrams. |
| 2,412,031 | 12/1946 | Bergsteim. |
| 2,439,435 | 4/1948 | Richardson. |
| 2,441,477 | 5/1948 | Farrell. |
| 2,496,043 | 1/1950 | Farrell. |
| 2,521,208 | 9/1950 | Eaton. |
| 2,530,787 | 11/1950 | Sanford. |
| 2,550,520 | 4/1951 | Bennett. |
| 2,670,128 | 2/1954 | Stowitts. |

DAVIS T. MOORHEAD, *Primary Examiner.*